(12) United States Patent
Shuai et al.

(10) Patent No.: US 12,718,981 B2
(45) Date of Patent: Aug. 25, 2026

(54) ISOLATION TRANSFORMER AND POWER CONVERTER

(71) Applicant: HUAWEI TECHNOLOGIES CO., LTD., Guangdong (CN)

(72) Inventors: Peng Shuai, Shenzhen (CN); Xiaoqing Hu, Dongguan (CN); Zhuyong Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 624 days.

(21) Appl. No.: 18/358,339

(22) Filed: Jul. 25, 2023

(65) Prior Publication Data

US 2023/0368970 A1 Nov. 16, 2023

Related U.S. Application Data

(63) Continuation of application No. PCT/CN2021/073997, filed on Jan. 27, 2021.

(51) Int. Cl.
*H01F 38/00* (2006.01)
*H01F 27/24* (2006.01)
(Continued)

(52) U.S. Cl.
CPC ............. *H01F 38/00* (2013.01); *H01F 27/24* (2013.01); *H01F 27/32* (2013.01);
(Continued)

(58) Field of Classification Search
CPC .......... H01F 38/00; H01F 27/24; H01F 27/32; H02M 3/33584; H02M 5/10; H02M 7/72
See application file for complete search history.

(56) References Cited

U.S. PATENT DOCUMENTS 2,114,189 A 4/1938 Kronmiller
4,333,900 A 6/1982 Carey
(Continued)

FOREIGN PATENT DOCUMENTS

CN 101795081 A * 8/2010
CN 103578715 B 6/2017
(Continued)

OTHER PUBLICATIONS

Extended European Search Report in European Appln No. 21921755.1, dated Feb. 29, 2024, 13 pages.

*Primary Examiner* — Malcolm Barnes
(74) *Attorney, Agent, or Firm* — Fish & Richardson P.C.

(57) ABSTRACT

This application provides an isolation transformer. The isolation transformer is applicable to a power converter, the power converter further includes a first power conversion circuit and a second power conversion circuit, the isolation transformer includes a high-voltage winding, a low-voltage winding, and a solid insulation housing. The high-voltage winding has a solid insulation layer and the solid insulation housing has an opening surface, the opening surface faces the second power conversion circuit, the solid insulation housing covers the low-voltage winding and the high-voltage winding that has the solid insulation layer, a conducting layer or a semi-conducting layer is disposed on the solid insulation housing, and the conducting layer or the semi-conducting layer of the solid insulation housing is grounded.

20 Claims, 7 Drawing Sheets

(51) Int. Cl.
*H01F 27/32* (2006.01)
*H02M 3/335* (2006.01)
*H02M 5/10* (2006.01)
*H02M 7/72* (2006.01)

(52) U.S. Cl.
CPC ......... *H02M 3/33584* (2013.01); *H02M 5/10* (2013.01); *H02M 7/72* (2013.01)

(56) References Cited

U.S. PATENT DOCUMENTS

| | | | | |
|---|---|---|---|---|
| 4,816,980 | A * | 3/1989 | Wiendl | H10W 90/00 363/35 |
| 2013/0100634 | A1 | 4/2013 | Okubo et al. | |
| 2018/0170193 | A1* | 6/2018 | He | H02J 50/10 |
| 2018/0211761 | A1* | 7/2018 | Zhang | H01F 27/363 |

FOREIGN PATENT DOCUMENTS

| | | | | | |
|---|---|---|---|---|---|
| CN | 107070247 | A | * | 8/2017 | H02M 3/33523 |
| CN | 211045235 | U | * | 7/2020 | |
| EP | 0082421 | A1 | | 6/1983 | |
| EP | 3364430 | A1 | | 8/2018 | |
| RU | 2107350 | C1 | | 3/1998 | |
| WO | WO-2021001028 | A1 | * | 1/2021 | H05K 7/14339 |

* cited by examiner

ISOLATION TRANSFORMER AND POWER CONVERTER

CROSS-REFERENCE TO RELATED APPLICATIONS

This application is a continuation of International Application No. PCT/CN2021/073997, filed on Jan. 27, 2021, the disclosure of which is hereby incorporated by reference in its entirety.

TECHNICAL FIELD

This application relates to the field of power electronics technologies, and in particular, to an isolation transformer and a power converter.

BACKGROUND

A solid state transformer (SST) is a medium-voltage/low-voltage power conversion system in which high-frequency isolation is used. As shown in FIG. 1, an SST system includes a plurality of power units (such as a power unit 1, a power unit 2, . . . , and a power unit N). Each power unit includes a high-voltage side power circuit, a medium frequency transformer, and a low-voltage side power circuit. An input end of a high-voltage side power circuit of each power unit may be connected to a three-phase alternating current grid, and an output end of a low-voltage side power circuit of each power unit may be connected to a direct current or alternating current grid, a load, an energy storage device, or the like. As shown in FIG. 2, in an SST system, a medium frequency transformer is used as a boundary between a high-voltage side circuit and a low-voltage side circuit, and an enhanced insulation requirement needs to be met. In addition, basic insulation requirements need to be met between a high-voltage side power circuit and a protection earth (PE) and between a low-voltage side power circuit and the protection earth, and a functional insulation requirement needs to be met between power units. Therefore, sufficient electric clearance and a sufficient creepage distance need to be reserved between the high-voltage side power circuit and a magnetic core of the transformer and a surface of a winding.

Currently, in a medium frequency transformer (MFT), solid insulation material filling processing may be performed on an entire winding, and an outer surface of the winding is coated with a semi-conductive material and is grounded or connected to a fixed low potential; or an entire winding may be immersed in a fuel tank as a winding chamber, and an outer surface of an insulation housing of the entire winding is grounded, suspended, or connected to a low potential. It can be learned that, if solid insulation material filling processing or liquid insulation material filling processing is performed on the entire winding of the medium frequency transformer, insulation materials and space are wasted, and it is difficult to dissipate heat of the entire winding during air cooling. In addition, when the transformer has a high working frequency and a small volume, to meet an electric clearance requirement of enhanced insulation, extra space still needs to be reserved between a high-voltage side circuit and a low-voltage side circuit. Consequently, internal space of a converter cannot be effectively used, reducing overall power density of power units.

SUMMARY

This application provides an isolation transformer and a power converter, to reduce a volume of the isolation transformer, improve power density of the power converter, and ensure low costs and high applicability.

According to a first aspect, this application provides an isolation transformer. The isolation transformer is applicable to a power converter, the power converter further includes a first power conversion module and a second power conversion module, the isolation transformer includes a high-voltage winding, a low-voltage winding, and a solid insulation housing, the high-voltage winding may be connected to the first power conversion module, and the low-voltage winding may be connected to the second power conversion module. Because the first power conversion module is connected to a medium- and high-voltage system, and the second power conversion module is connected to a low-voltage system, an insulation withstand voltage requirement of the first power conversion module on the ground is higher than an insulation withstand voltage requirement of the second power conversion module on the ground. The high-voltage winding has a solid insulation layer, a conducting layer or a semi-conducting layer is disposed on the solid insulation layer, and the conducting layer or the semi-conducting layer is grounded, to implement solid insulation processing on the high-voltage winding. The solid insulation housing has an opening surface, the opening surface faces the second power conversion module, the solid insulation housing may completely cover the low-voltage winding and the high-voltage winding that has the solid insulation layer, a conducting layer or a semi-conducting layer is disposed on the solid insulation housing, and the conducting layer or the semi-conducting layer is grounded. Herein, another surface of the solid insulation housing except the opening surface is a closed surface, which indicates that a surface that is of the solid insulation housing and that faces the first power conversion module is a closed surface.

According to the isolation transformer provided in this application, solid insulation processing is performed on the high-voltage winding, and no insulation processing is performed on the low-voltage winding. In this way, internal space of the isolation transformer can be effectively used, and an insulation material can be saved, so that a volume of the isolation transformer is reduced, and lower costs are ensured. In addition, the solid insulation housing may cover the low-voltage winding and the high-voltage winding that has the solid insulation layer, so that electric clearance and a creepage distance between the first power conversion module in the power converter and the isolation transformer are increased. Therefore, an air gap required between the first power conversion module in the power converter and the isolation transformer and an air gap required between the first power conversion module and the second power conversion module can be reduced. In this way, internal space of the power converter can be effectively used, so that power density of the power converter is improved, and higher applicability is ensured.

With reference to the first aspect, in a first possible implementation, the conducting layer or the semi-conducting layer is disposed on an outer surface of the solid insulation layer, or the conducting layer or the semi-conducting layer is disposed at (for example, embedded in) an internal position close to the outer surface of the solid insulation layer. According to the isolation transformer provided in this application, the conducting layer or the semi-conducting layer is disposed on the outer surface of the solid insulation layer or at the internal position close to the outer surface of the solid insulation layer, so that insulation and electric field shielding processing is implemented on the high-voltage winding, and no insulation processing is performed on the low-voltage winding. In this way, internal space of the isolation transformer can be effectively used, and an insulation material can be saved, so that a volume of the isolation transformer is reduced, and lower costs and higher applicability are ensured.

With reference to the first aspect or the first possible implementation of the first aspect, in a second possible implementation, the conducting layer or the semi-conducting layer is disposed on an inner surface of the solid insulation housing, or the conducting layer or the semi-conducting layer is disposed at (for example, embedded in) an internal position close to the inner surface of the solid insulation housing. According to the isolation transformer provided in this application, the conducting layer or the semi-conducting layer is disposed on the inner surface of the solid insulation housing or at the internal position close to the inner surface of the solid insulation housing. Therefore, insulation processing is implemented on the isolation transformer, so that an air gap required between the first power conversion module in the power converter and the isolation transformer and an air gap required between the first power conversion module and the second power conversion module are reduced. In this way, internal space of the power converter can be effectively used, so that power density of the power converter is improved, and higher applicability is ensured.

With reference to any one of the first aspect to the second possible implementation of the first aspect, in a third possible implementation, the isolation transformer further includes a magnetic core. Another surface of the solid insulation housing except the opening surface may completely cover the magnetic core of the isolation transformer. It may be understood that, another surface of the solid insulation housing except the opening surface may completely cover the low-voltage winding, the magnetic core, and the high-voltage winding that has the solid insulation layer, to implement insulation processing on the isolation transformer.

With reference to any one of the first aspect to the second possible implementation of the first aspect, in a fourth possible implementation, the isolation transformer further includes a magnetic core. Another surface of the solid insulation housing except the opening surface may completely cover a part that is of the magnetic core of the isolation transformer and that faces the first power conversion module, and partially cover a part that is of the magnetic core of the isolation transformer and that faces the second power conversion module. It may be understood that, another surface of the solid insulation housing except the opening surface may completely cover the low-voltage winding, a part that is of the magnetic core and that faces the first power conversion module, and the high-voltage winding that has the solid insulation layer, and partially cover a part that is of the magnetic core and that faces the second power conversion module, to implement insulation processing on the isolation transformer.

With reference to any one of the first aspect to the fourth possible implementation of the first aspect, in a fifth possible implementation, a high-voltage outlet terminal is disposed on the solid insulation housing. An outlet of the high-voltage winding may be connected to the first power conversion module through the solid insulation housing and the high-voltage outlet terminal. According to the isolation transformer provided in this application, an air gap required between the first power conversion module in the power converter and the isolation transformer can be reduced. In this way, internal space of the power converter can be effectively used, so that power density of the power converter is improved, and higher applicability is ensured.

With reference to any one of the first aspect to the fifth possible implementation of the first aspect, in a sixth possible implementation, an outlet of the low-voltage winding is coupled to the second power conversion module through the opening surface of the solid insulation housing. In other words, the outlet of the low-voltage winding may be directly or indirectly connected to the second power conversion module through the opening surface of the solid insulation housing. According to the isolation transformer provided in this application, an air gap required between the first power conversion module and the second power conversion module in the power converter can be reduced. In this way, internal space of the power converter can be effectively used, so that power density of the power converter is improved, and higher applicability is ensured.

With reference to any one of the first aspect to the sixth possible implementation of the first aspect, in a seventh possible implementation, the solid insulation housing includes an oblique closed surface, a curved closed surface, a straight closed surface, and/or a closed surface of another shape. Herein, the shape of the solid insulation housing may be determined based on the shapes of the magnetic core, the high-voltage winding, and the low-voltage winding. In this way, internal space of the isolation transformer can be effectively used, and overall heat dissipation of the isolation transformer and the power conversion module can be improved during air cooling, so that higher applicability is ensured.

According to a second aspect, this application provides a power converter. The power converter includes at least one first power conversion module, at least one second power conversion module, and at least one isolation transformer provided in any one of the first aspect to the seventh possible implementation of the first aspect. The at least one first power conversion module may be connected to the at least one second power conversion module through the at least one isolation transformer, and an insulation withstand voltage requirement of the first power conversion module on the ground is higher than an insulation withstand voltage requirement of the second power conversion module on the ground.

It may be understood that the power converter may be a bidirectional power converter, for example, an alternating current (AC)/AC converter, an AC/direct current (DC) converter, an AC/DC converter, a DC/DC converter, or a DC/AC converter. The first power conversion module may convert a high-voltage side voltage into a first high-frequency alternating current voltage, and output a second high-frequency alternating current voltage to the second power conversion module through the isolation transformer based on the first high-frequency alternating current voltage. A frequency of the first high-frequency alternating current voltage is the same as a frequency of the second high-frequency alternating current voltage. The second power conversion module may convert, into a low-voltage side voltage, the second high-frequency alternating current voltage input by the isolation transformer, and output the low-voltage side voltage to a load (a direct current grid, an alternating current grid, or an energy storage device). Optionally, the second power conversion module may alternatively convert a low-voltage side voltage into a second high-frequency alternating current voltage, and output a first high-frequency alternating current voltage to the first power conversion module through the isolation transformer based on the second high-frequency alternating current voltage.

The first power conversion module may further convert, into a high-voltage side voltage, the first high-frequency alternating current voltage input by the isolation transformer, and output the high-voltage side voltage to a load.

According to the power converter provided in this application, overall insulation processing is performed on the isolation transformer, so that an air gap required between the first power conversion module in the power converter and the isolation transformer can be reduced, and an air gap required between the first power conversion module and the second power conversion module in the power converter can also be reduced. In this way, internal space of the power converter can be effectively used, so that power density of the power converter is improved, and higher applicability is ensured.

With reference to the second aspect, in a first possible implementation, the power converter further includes a conductor layer, the conductor layer covers an opening surface of a solid insulation housing of the at least one isolation transformer, and the conductor layer is connected to a conductive housing of the power converter and is grounded. The conductor layer may be configured to: isolate the at least one isolation transformer and the at least one first power conversion module from a first conductive cavity of the power converter, and isolate the at least one second power conversion module from a second conductive cavity of the power converter except the first conductive cavity. According to the power converter provided in this application, the opening surface of the solid insulation housing may cover the conductor layer connected to the conductive housing, and the at least one isolation transformer and the at least one first power conversion module and the at least one second power conversion module are isolated from different conductive cavities, so that an air gap required between the first power conversion module and the second power conversion module in the power converter can be further reduced. In this way, internal space of the power converter can be effectively used, so that power density of the power converter is improved, and higher applicability is ensured.

With reference to the first possible implementation of the second aspect, in a second possible implementation, an outlet of a low-voltage winding of the isolation transformer is connected to the second power conversion module through the opening surface of the solid insulation housing and the conductor layer.

With reference to any one of the second aspect to the second possible implementation of the second aspect, in a third possible implementation, the power converter may be a bidirectional AC/AC converter. The first power conversion module and the second power conversion module each are an AC/AC conversion module.

With reference to any one of the second aspect to the second possible implementation of the second aspect, in a fourth possible implementation, the power converter may be a bidirectional AC/DC converter. The first power conversion module is an AC/AC conversion module, and the second power conversion module is an AC/DC conversion module.

With reference to any one of the second aspect to the second possible implementation of the second aspect, in a fifth possible implementation, the power converter may be a bidirectional DC/DC converter. The first power conversion module is a DC/AC conversion module, and the second power conversion module is an AC/DC conversion module.

With reference to any one of the second aspect to the second possible implementation of the second aspect, in a sixth possible implementation, the power converter may be a bidirectional DC/AC converter. The first power conversion module is a DC/AC conversion module, and the second power conversion module is an AC/AC conversion module.

With reference to any one of the second aspect to the sixth possible implementation of the second aspect, in a seventh possible implementation, the power converter may include a plurality of first power conversion modules and one isolation transformer, and the isolation transformer includes a plurality of high-voltage windings. One end of one first power conversion module in the plurality of first power conversion modules is connected to one high-voltage winding of the isolation transformer, and the other ends of the plurality of first power conversion modules are connected in series or parallel, or are not connected to each other.

With reference to any one of the second aspect to the seventh possible implementation of the second aspect, in an eighth possible implementation, the power converter includes a plurality of first power conversion modules and a plurality of isolation transformers, and the isolation transformer includes one high-voltage winding. One end of one first power conversion module in the plurality of first power conversion modules is connected to a high-voltage winding of one isolation transformer, and the other ends of the plurality of first power conversion modules are connected in series or parallel, or are not connected to each other.

With reference to any one of the second aspect to the eighth possible implementation of the second aspect, in a ninth possible implementation, the power converter includes a plurality of second power conversion modules and one isolation transformer, and the isolation transformer includes a plurality of low-voltage windings. One end of one second power conversion module in the plurality of second power conversion modules is connected to one low-voltage winding of the isolation transformer, and the other ends of the plurality of second power conversion modules are connected in series or parallel, or are not connected to each other.

With reference to any one of the second aspect to the ninth possible implementation of the second aspect, in a tenth possible implementation, the power converter includes a plurality of second power conversion modules and a plurality of isolation transformers, and the isolation transformer includes one low-voltage winding. One end of one second power conversion module in the plurality of second power conversion modules is connected to a low-voltage winding of one isolation transformer, and the other ends of the plurality of second power conversion modules are connected in series or parallel, or are not connected to each other.

With reference to any one of the second aspect to the tenth possible implementation of the second aspect, in an eleventh possible implementation, the power converter includes one first power conversion module and a plurality of isolation transformers, and the isolation transformer includes one high-voltage winding. High-voltage windings of the plurality of isolation transformers are connected in series to the first power conversion module.

With reference to any one of the second aspect to the eleventh possible implementation of the second aspect, in a twelfth possible implementation, the power converter includes one second power conversion module and a plurality of isolation transformers, and the isolation transformer includes one low-voltage winding. Low-voltage windings of the plurality of isolation transformers are connected in series to the second power conversion module.

In this application, internal space of the isolation transformer can be effectively used, and an insulation material can be saved, so that a volume of the isolation transformer is reduced, and lower costs are ensured. In addition, an air gap required between functional modules in the power converter can be reduced. In this way, internal space of the power converter can be effectively used, so that power density of the power converter is improved, and higher applicability is ensured.

DESCRIPTION OF EMBODIMENTS

Figure 1:
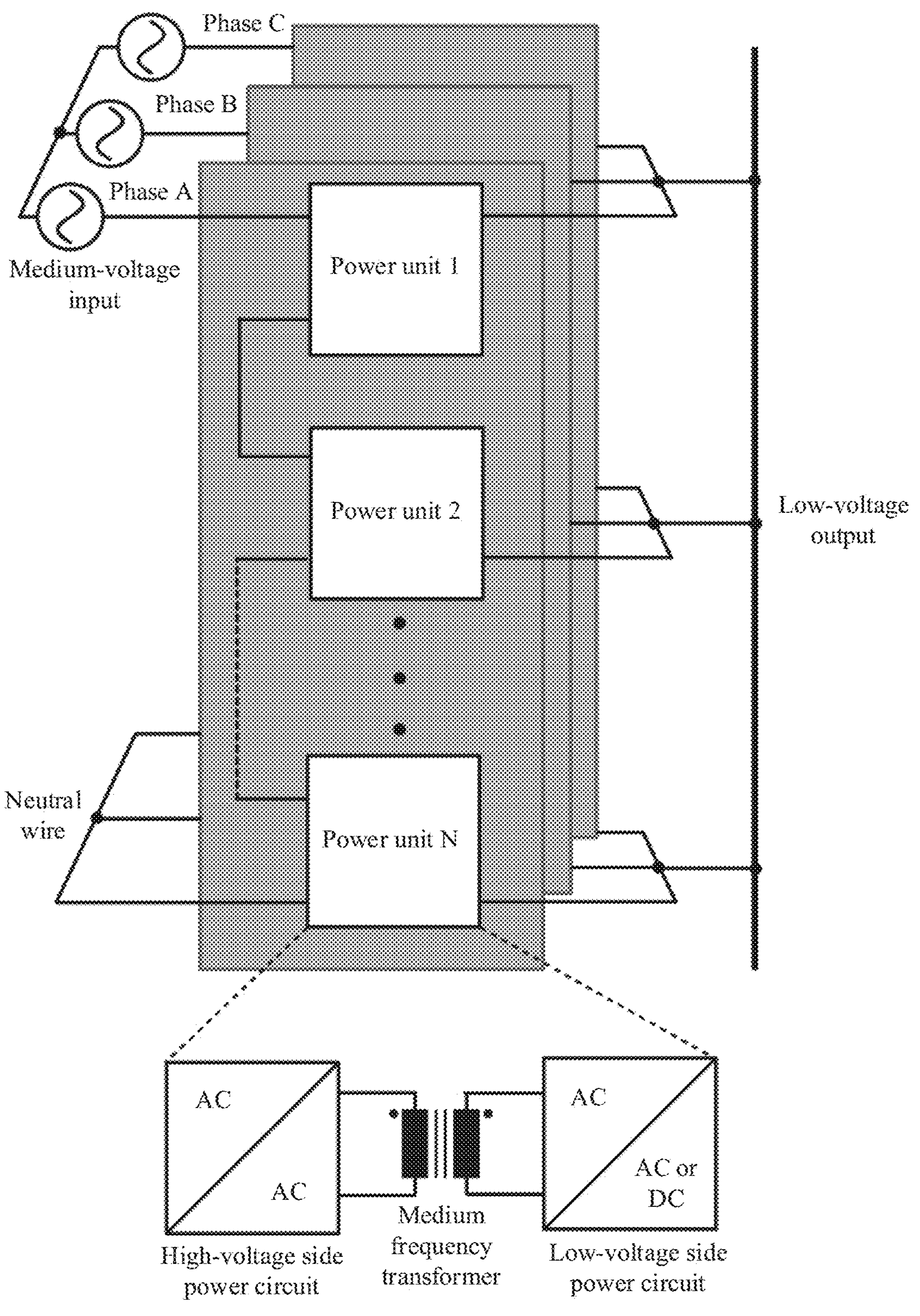
FIG. 1 is a schematic diagram of a structure of a solid state transformer.
Figure 2:
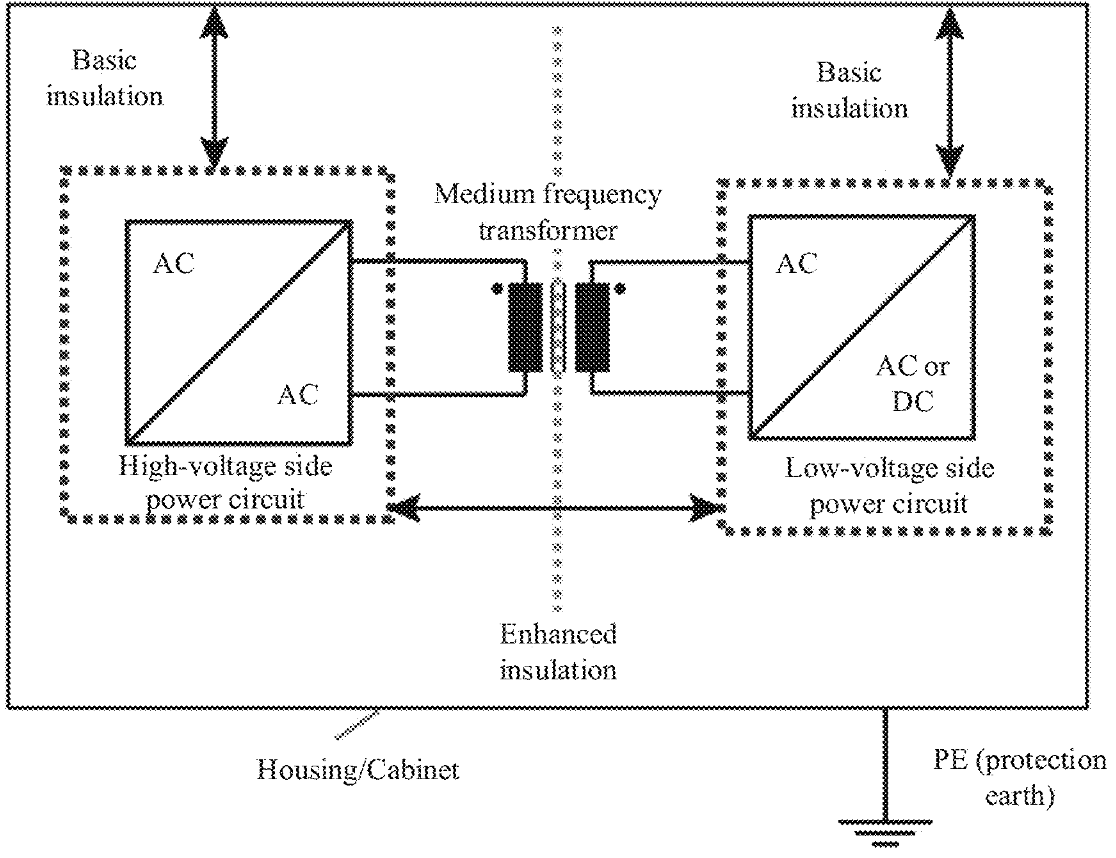
FIG. 2 is a schematic diagram of an insulation structure of a power unit in a solid state transformer.

A power converter provided in this application is applicable to a plurality of application fields, such as a new energy intelligent microgrid field, a power transmission and distribution field, a new energy field (for example, a photovoltaic grid-connected field or a wind power grid-connected field), a photovoltaic power generation field (for example, a household device (for example, a refrigerator or an air conditioner) or grid power supply), a wind power generation field, or a high-power converter field (for example, converting a direct current into a high-power high-voltage alternating current). This may be specifically determined based on an actual application scenario, and is not limited herein.

The power converter provided in this application may include at least one first power conversion module (namely, one or more first power conversion modules), at least one second power conversion module (namely, one or more second power conversion modules), and at least one isolation transformer (namely, one or more isolation transformers). In this application, one or more functional modules or hardware devices that have a high insulation withstand voltage requirement on the ground in the power converter may be collectively referred to as a first power conversion module. In this application, one or more functional modules or hardware devices that have a low insulation withstand voltage requirement on the ground in the power converter may be collectively referred to as a second power conversion module. The at least one first power conversion module may be connected to the at least one second power conversion module through the at least one isolation transformer, and an insulation withstand voltage requirement of the first power conversion module on the ground is higher than an insulation withstand voltage requirement of the second power conversion module on the ground. According to the power converter provided in this application, overall insulation processing is performed on the isolation transformer, so that an air gap required between the first power conversion module in the power converter and the isolation transformer can be reduced, and an air gap required between the first power conversion module and the second power conversion module in the power converter can also be reduced. In this way, internal space of the power converter can be effectively used, so that power density of the power converter is improved, and higher applicability is ensured. The power converter provided in this application is applicable to a solid state transformer, or is applicable to another modular power conversion system including an isolation transformer. The power converter provided in this application may adapt to different application scenarios, such as a photovoltaic grid-connected power supply scenario, a wind power grid-connected power supply scenario, an electric vehicle charging scenario, or another application scenario. The following uses the electric vehicle charging scenario as an example for description. Details are not described below again.

Figure 3:
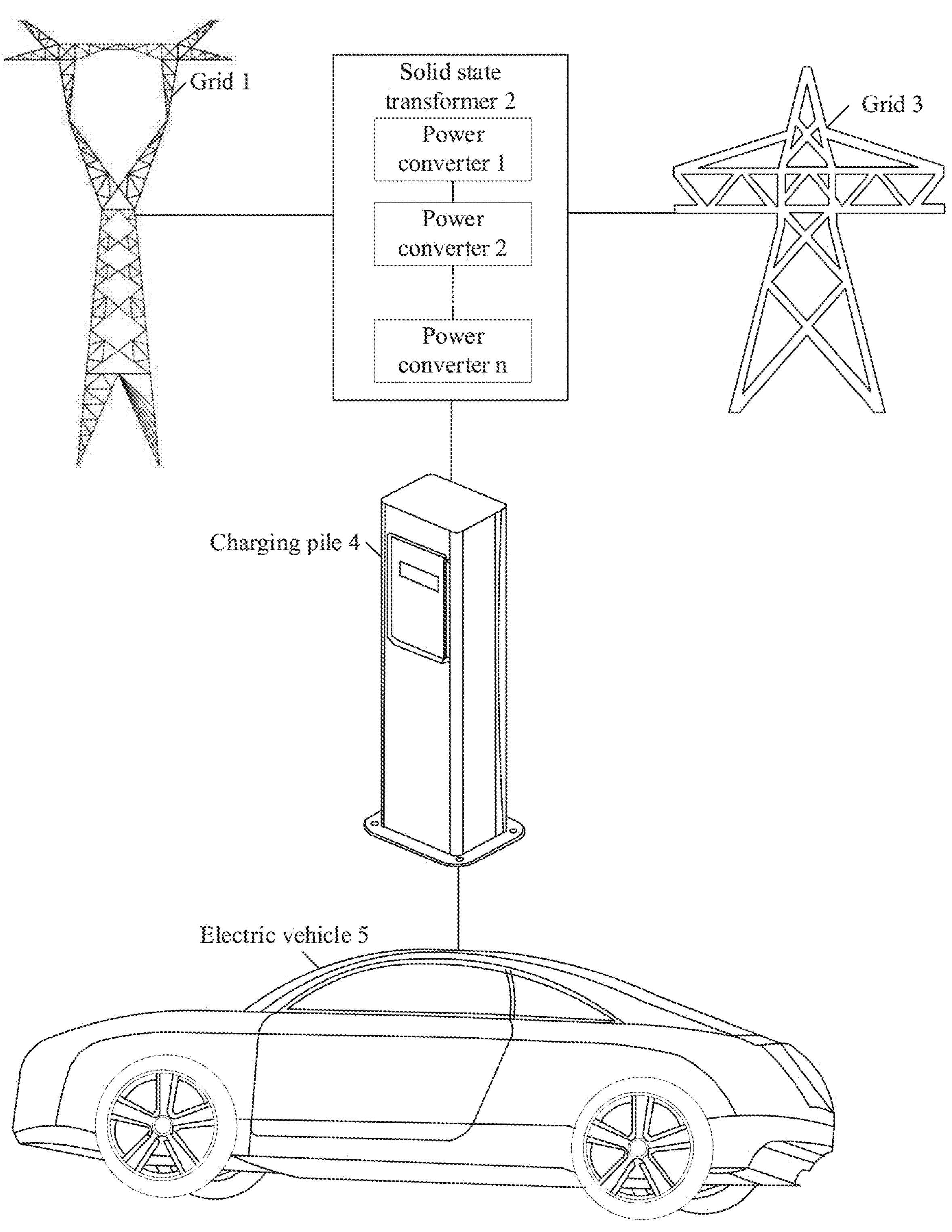
FIG. 3 is a schematic diagram of an application scenario of a power converter according to this application.

FIG. 3 is a schematic diagram of an application scenario of a power converter according to this application. As shown in FIG. 3, a solid state transformer (for example, a solid state transformer 2) may include a plurality of power converters (such as a power converter 1 to a power converter n). The power converter herein may be a hardware device integrating one or more functional modules. The solid state transformer 2 herein may be formed through input series output parallel (ISOP) of the power converter 1 to the power converter n. To be specific, input ends of the power converter 1 to the power converter n are connected in series, and output ends of the power converter 1 to the power converter n are connected in parallel. As shown in FIG. 3, a medium- and high-voltage grid (for example, a grid 1, where the grid 1 may be a direct current grid or an alternating current grid) may input an alternating current voltage/a direct current voltage to the solid state transformer 2. The solid state transformer 2 may perform, through the power converter 1 to the power converter n, power conversion on the alternating current voltage/direct current voltage provided by the grid 1, to obtain a specific direct current voltage to supply power to a direct current load (for example, a direct current charging pile). The direct current charging pile (for example, a charging pile 4) herein may be a power supply apparatus that is fixedly mounted outside an electric vehicle (for example, an electric vehicle 5) and that provides a direct current power supply for a power battery of the non-vehicle electric vehicle 5. In this case, because the charging pile 4 (namely, the direct current charging pile) supplies power to the electric vehicle 5 by using a three-phase four-wire system, sufficient power can be provided for the electric vehicle 5, and an adjustment range of a direct current voltage and a current output by the charging pile 4 is large, the charging pile 4 can implement fast charging of the electric vehicle 5. Optionally, the solid state transformer 2 may alternatively perform, through the power converter 1 to the power converter n, power conversion on an alternating current voltage/a direct current voltage provided by a grid 1, to obtain a specific alternating current voltage/direct current voltage to transmit power to an alternating current load/a direct current load (for example, a grid 3). The grid 3 herein may be an alternating current grid or a direct current grid. It may be understood that the solid state transformer 2 may alternatively perform, through the power converter 1 to the power converter n, power conversion on an alternating current voltage/a direct current voltage provided by a grid 1, to supply power to a direct current grid, an alternating current grid, an energy storage device (for example, a battery), and another load. This may be specifically determined based on an actual application scenario, and is not limited herein.

The following describes, with reference to FIG. 4 to FIG. 7, a power converter and an isolation transformer provided in this application and working principles of the power converter and the isolation transformer.

Figure 4:
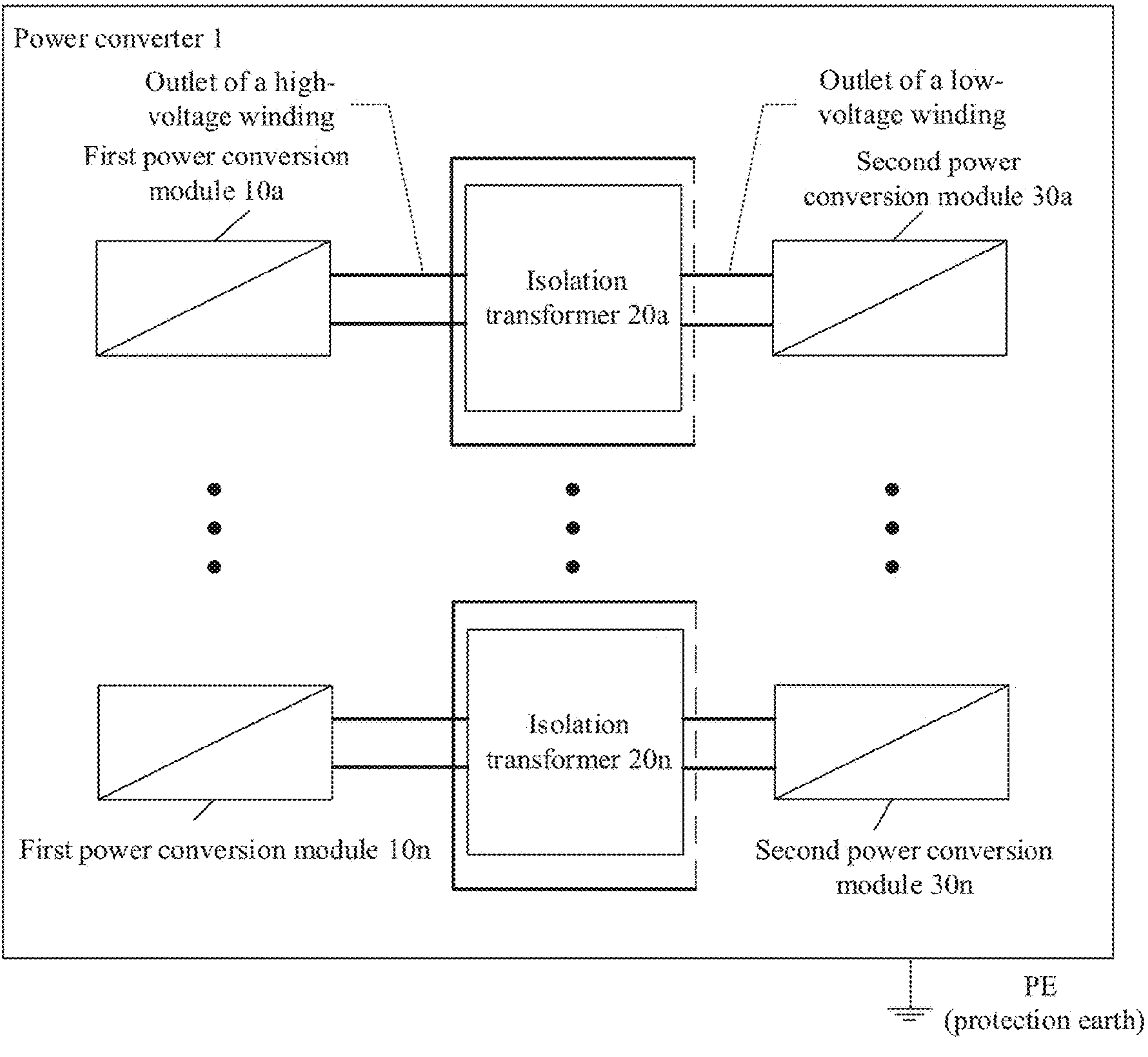
FIG. 4 is a schematic diagram of a structure of a power converter according to this application.

FIG. 4 is a schematic diagram of a structure of a power converter according to this application. As shown in FIG. 4, a power converter 1 may include a plurality of first power conversion modules (such as a first power conversion module 10*a* to a first power conversion module 10*n*), a plurality of isolation transformers (such as an isolation transformer 20*a* to an isolation transformer 20*n*), and a plurality of second power conversion modules (such as a second power conversion module 30*a* to a second power conversion module 30*n*). An insulation withstand voltage requirement of the first power conversion module on the ground is higher than an insulation withstand voltage requirement of the second power conversion module on the ground. Any one of the first power conversion module 10*a* to the first power conversion module 10*n* may be a high-voltage side power circuit, and any one of the second power conversion module 30*a* to the second power conversion module 30*n* may be a low-voltage side power circuit. The high-voltage side and the low-voltage side herein may be understood as insulation withstand voltage requirements on the ground. In other words, a power conversion circuit having a high insulation withstand voltage requirement on the ground may be understood as the high-voltage side power circuit, and a power conversion circuit having a low insulation withstand voltage requirement on the ground (that is, lower than the insulation withstand voltage requirement of the high-voltage side power circuit on the ground) may be understood as the low-voltage side power circuit. Herein, a high-voltage winding and a low-voltage winding in the isolation transformer are electrically isolated, and a working frequency of the isolation transformer may be a high frequency (greater than 50 kHz), a medium frequency (1 kHz to 50 kHz), or a low frequency (less than 1 kHz). It may be understood that the power converter is a safe power supply, and has protection, lightning protection, and filtering functions. In addition, because the high-voltage side and the low-voltage side of the isolation transformer are completely isolated, a safe power supply voltage may be provided for an electric device (for example, a direct current grid, an alternating current grid, an energy storage device (for example, a battery), or another load), to ensure electric safety at the low-voltage side.

In some feasible implementations, when the power converter includes a plurality of isolation transformers (such as the isolation transformer 20*a* to the isolation transformer 20*n*), each isolation transformer includes one high-voltage winding and one low-voltage winding. When the power converter further includes a plurality of first power conversion modules and a plurality of the second power conversion modules, one first power conversion module may be connected to one second power conversion module through one isolation transformer, one end of one first power conversion module in the plurality of first power conversion modules is connected to a high-voltage winding of one isolation transformer, and one end of one second power conversion module in the plurality of second power conversion modules is connected to a low-voltage winding of one isolation transformer. The other ends (namely, ends that are not connected to the high-voltage windings) of the plurality of first power conversion modules (such as the first power conversion module 10*a* to the first power conversion module 10*n*) may be connected in series or parallel, or may not be connected to each other. The other ends (namely, ends that are not connected to the low-voltage windings) of the plurality of second power conversion modules (such as the second power conversion module 30*a* to the second power conversion module 30*n*) may be connected in series or parallel, or may not be connected to each other. Herein, "not be connected to each other" may be understood as that there is no connection relationship between the other ends of the power conversion modules (such as the first power conversion modules or the second power conversion modules), and the other ends of the power conversion modules may be respectively connected to power supplies or loads corresponding to the power conversion modules. For example, as shown in FIG. 4, one end of the first power conversion module 10*a* is connected to a high-voltage winding of the isolation transformer 20*a*, one end of the second power conversion module 30*a* is connected to a low-voltage winding of the isolation transformer 20*a*, . . . , one end of the first power conversion module 10*n* is connected to a high-voltage winding of the isolation transformer 20*n*, and one end of the second power conversion module 30*n* is connected to a low-voltage winding of the isolation transformer 20*n*.

In some feasible implementations, when the power converter includes one first power conversion module, a plurality of isolation transformers, and one second power conversion module, high-voltage windings of the plurality of isolation transformers may be connected in series to each other and then connected to the first power conversion module, and low-voltage windings of the plurality of isolation transformers may be connected in series to each other and then connected to the second power conversion module. When the power converter includes a plurality of first power conversion modules, a plurality of isolation transformers, and one second power conversion module, one end of one first power conversion module in the plurality of first power conversion modules is connected to a high-voltage winding of one isolation transformer, and low-voltage windings of the plurality of isolation transformers may be connected in series to each other and then connected to the second power conversion module. The other ends (namely, ends that are not connected to the high-voltage windings) of the plurality of first power conversion modules may be connected in series or parallel, or may not be connected to each other. When the power converter includes one first power conversion module, a plurality of isolation transformers, and a plurality of second power conversion modules, high-voltage windings of the plurality of isolation transformers may be connected in series to each other and then connected to the first power conversion module, and one end of one second power conversion module in the plurality of second power conversion modules is connected to a low-voltage winding of one isolation transformer. The other ends (namely, ends that are not connected to the low-voltage windings) of the plurality of second power conversion modules may be connected in series or parallel, or may not be connected to each other. It can be learned that, when the power converter includes a plurality of isolation transformers, on a side, of the power converter, on which a plurality of power conversion modules (such as a plurality of first power conversion modules or a plurality of second power conversion modules) are disposed, one end of one power conversion module in the plurality of power conversion modules is connected to a winding (for example, a high-voltage winding or a low-voltage winding) of one isolation transformer, and the other ends of the power conversion modules may be connected in series or parallel, or may not be connected to each other; or on a side, of the power converter, on which one power conversion module is disposed, windings of the plurality of isolation transformers may be connected in series to each other and then connected to one power conversion module.

In some feasible implementations, when the power converter includes one isolation transformer, the isolation transformer may include one or more high-voltage windings and one or more low-voltage windings. When the isolation transformer includes a plurality of high-voltage windings or a plurality of low-voltage windings, there is no connection relationship between the plurality of high-voltage windings, or there is no connection relationship between the plurality of low-voltage windings. When the power converter includes a plurality of first power conversion modules, one isolation transformer, and a plurality of second power conversion modules, the isolation transformer includes a plurality of high-voltage windings and a plurality of low-voltage windings, one end of one first power conversion module in the plurality of first power conversion modules is connected to one high-voltage winding of the isolation transformer, and one end of one second power conversion module in the plurality of second power conversion modules is connected to one low-voltage winding of the isolation transformer. The other ends (namely, ends that are not connected to the high-voltage windings) of the plurality of first power conversion modules may be connected in series or parallel, or may not be connected to each other. The other ends (namely, ends that are not connected to the low-voltage windings) of the plurality of second power conversion modules may be connected in series or parallel, or may not be connected to each other. When the power converter includes a plurality of first power conversion modules, one isolation transformer, and one second power conversion module, the isolation transformer includes a plurality of high-voltage windings and one low-voltage winding. One end of one first power conversion module in the plurality of first power conversion modules is connected to one high-voltage winding of the isolation transformer, and the other ends of the plurality of first power conversion modules may be connected in series or parallel, or may not be connected to each other. The low-voltage winding of the isolation transformer is connected to the second power conversion module.

In some feasible implementations, when the power converter includes one first power conversion module, one isolation transformer, and a plurality of second power conversion modules, the isolation transformer includes one high-voltage winding and a plurality of low-voltage windings. The high-voltage winding of the isolation transformer is connected to the first power conversion module. One end of one second power conversion module in the plurality of second power conversion modules is connected to a low-voltage winding of one isolation transformer, and the other ends of the plurality of second power conversion modules may be connected in series or parallel, or may not be connected to each other. When the power converter includes one first power conversion module, one isolation transformer, and one second power conversion module, the isolation transformer includes one high-voltage winding and one low-voltage winding. The high-voltage winding may be connected to the first power conversion module, and the low-voltage winding may be connected to the second power conversion module. It can be learned that, when the power converter includes one isolation transformer, on a side, of the power converter, on which a plurality of power conversion modules (such as a plurality of first power conversion modules or a plurality of second power conversion modules) are disposed, one end of one power conversion module in the plurality of power conversion modules may be connected to one winding (for example, a high-voltage winding or a low-voltage winding) in a plurality of windings of the isolation transformer, and the other ends of the power conversion modules may be connected in series or parallel, or may not be connected to each other; or on a side, of the power converter, on which one power conversion module is disposed, the power conversion module may be connected to a winding of the isolation transformer.

Figure 5:
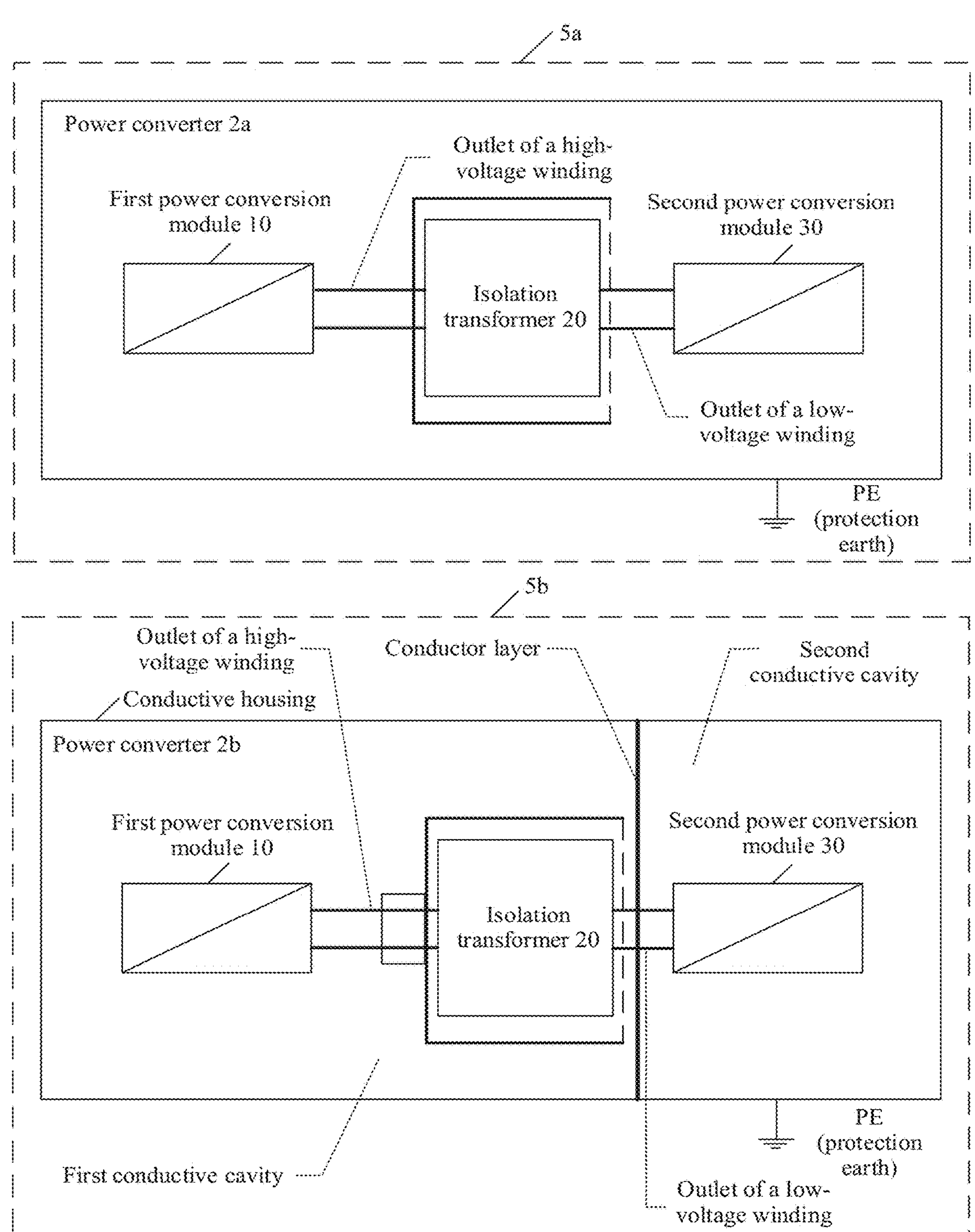
FIG. 5 is a schematic diagram of another structure of a power converter according to this application.

FIG. 5 is a schematic diagram of another structure of a power converter according to this application. As shown in 5*a* in FIG. 5, a power converter 2*a* may include a first power conversion module 10 (for example, any one of the first power conversion module 10*a* to the first power conversion module 10*n* in FIG. 4), an isolation transformer 20 (for example, any one of the isolation transformer 20*a* to the isolation transformer 20*n* in FIG. 4), and a second power conversion module 30 (for example, any one of the second power conversion module 30*a* to the second power conversion module 30*n* in FIG. 4). The isolation transformer 20 may include one high-voltage winding and one low-voltage winding. The first power conversion module 10 may be connected to the second power conversion module 30 through the isolation transformer 20. In addition, the high-voltage winding of the isolation transformer 20 may be connected to the first power conversion module 10, and the low-voltage winding of the isolation transformer 20 may be connected to the second power conversion module 30. In this case, an outlet of the high-voltage winding of the isolation transformer 20 may be coupled to the first power conversion module 10 through a solid insulation housing, and an outlet of the low-voltage winding of the isolation transformer 20 may be coupled to the second power conversion module 30 through an opening surface of the solid insulation housing.

As shown in 5*b* in FIG. 5, a power converter 2*b* may further include a conductor layer. The conductor layer may cover an opening surface of a solid insulation housing of an isolation transformer 20. In addition, the conductor layer is connected to a conductive housing of the power converter 2*b* and is grounded (namely, a protection earth). Herein, the conductive housing of the power converter 2*b* is connected to the protection earth PE. It may be understood that, when the size of the solid insulation housing of the isolation transformer 20 is the same as the size of the conductive housing of the power converter 2*b*, the conductor layer may be connected to the conductive housing of the power converter 2*b* when completely covering the opening surface of the solid insulation housing of the isolation transformer 20. Optionally, when the size of the solid insulation housing of the isolation transformer 20 is smaller than the size of the conductive housing of the power converter 2*b*, the conductor layer not only needs to completely cover the opening surface of the solid insulation housing of the isolation transformer 20, but also needs to be connected to the conductive housing of the power converter 2*b*. Herein, a material of the conductor layer may include a conductive material and a semi-conductive material. For example, the conductor layer may be a metal conductive mesh, a conductive nylon mesh, a metal zinc powder layer, or another conductor layer. This may be specifically determined based on an actual application scenario, and is not limited herein. The conductor layer may divide the power converter 2*b* into a first conductive cavity and a second conductive cavity, to isolate the isolation transformer 20 and the first power conversion module 10 from the first conductive cavity, and isolate the second power conversion module 30 from the second conductive cavity. In this way, internal space of the power converter can be further effectively used, so that power density of the power converter is improved, and higher applicability is ensured. In this case, an outlet of a high-voltage winding of the isolation transformer 20 may be connected to the first power conversion module 10 through the solid insulation housing and a high-voltage outlet terminal, and an outlet of a low-voltage winding of the isolation transformer 20 may be connected to the second power conversion module 30 through the opening surface of the solid insulation housing and the conductor layer.

In some feasible implementations, when the power converter 1 in FIG. 4 may further include a conductor layer, the conductor layer may cover opening surfaces of solid insulation housings of the isolation transformer 20*a* to the isolation transformer 20*n*. In addition, the conductor layer is connected to a conductive housing of the power converter 1 and is grounded. Herein, the conductive housing of the power converter 1 is connected to a protection earth PE. The conductor layer may divide the power converter 1 into a first conductive cavity and a second conductive cavity, to isolate the first power conversion module 10*a* to the first power conversion module 10*n* and the isolation transformer 20*a* to the isolation transformer 20*n* from the first conductive cavity, and isolate the second power conversion module 30*a* to the second power conversion module 30*n* from the second conductive cavity.

In some feasible implementations, the power converter (for example, the power converter 2*a* or the power converter 2*b*) may be a bidirectional power converter, for example, an AC/AC converter, an AC/DC converter, a DC/DC converter, or a DC/AC converter. This may be specifically determined based on an actual application scenario, and is not specifically limited herein. For ease of description, the following uses the power converter 2*a* as an example for description. Details are not described below again. When the power converter 2*a* is a bidirectional AC/AC converter, the first power conversion module 10 is an AC/AC conversion module, and the second power conversion module 30 is an AC/AC conversion module. The first power conversion module 10 may convert a high-voltage side alternating current voltage (for example, a voltage provided by an alternating current grid) into a first high-frequency alternating current voltage, and output a second high-frequency alternating current voltage to the second power conversion module 30 through the isolation transformer 20 based on the first high-frequency alternating current voltage. A frequency of the first high-frequency alternating current voltage is the same as a frequency of the second high-frequency alternating current voltage. In this case, the second power conversion module 30 may convert, into a low-voltage side alternating current voltage, the second high-frequency alternating current voltage input by the isolation transformer 20, and output the low-voltage side alternating current voltage to an alternating current load (for example, the alternating current grid). Optionally, the second power conversion module 30 may alternatively convert a low-voltage side alternating current voltage into a second high-frequency alternating current voltage, and output a first high-frequency alternating current voltage to the first power conversion module 10 through the isolation transformer 20 based on the second high-frequency alternating current voltage. In this case, the first power conversion module 10 may further convert, into a high-voltage side alternating current voltage, the first high-frequency alternating current voltage input by the isolation transformer 20, and output the high-voltage side alternating current voltage to an alternating current load (for example, a three-phase alternating current grid).

In some feasible implementations, when the power converter 2*a* is a bidirectional AC/DC converter, the first power conversion module is an AC/AC conversion module, and the second power conversion module is an AC/DC conversion module. The first power conversion module 10 may convert a high-voltage side alternating current voltage (for example, a voltage provided by an alternating current grid) into a first high-frequency alternating current voltage, and output a second high-frequency alternating current voltage to the second power conversion module 30 through the isolation transformer 20 based on the first high-frequency alternating current voltage. In this case, the second power conversion module 30 may convert, into a low-voltage side direct current voltage, the second high-frequency alternating current voltage input by the isolation transformer 20, and output the low-voltage side direct current voltage to a direct current load (for example, a direct current grid or an energy storage device). Optionally, the second power conversion module 30 may alternatively convert a low-voltage side direct current voltage into a second high-frequency alternating current voltage, and output a first high-frequency alternating current voltage to the first power conversion module 10 through the isolation transformer 20 based on the second high-frequency alternating current voltage. In this case, the first power conversion module 10 may further convert, into a high-voltage side alternating current voltage, the first high-frequency alternating current voltage input by the isolation transformer 20, and output the high-voltage side alternating current voltage to an alternating current load (for example, a three-phase alternating current grid).

In some feasible implementations, when the power converter 2*a* is a bidirectional DC/DC converter, the first power conversion module is a DC/AC conversion module, and the second power conversion module is an AC/DC conversion module. The first power conversion module 10 may convert a high-voltage side direct current voltage (for example, a voltage provided by a direct current grid) into a first high-frequency alternating current voltage, and output a second high-frequency alternating current voltage to the second power conversion module 30 through the isolation transformer 20 based on the first high-frequency alternating current voltage. In this case, the second power conversion module 30 may convert, into a low-voltage side direct current voltage, the second high-frequency alternating current voltage input by the isolation transformer 20, and output the low-voltage side direct current voltage to a direct current load (for example, a direct current grid or an energy storage device). Optionally, the second power conversion module 30 may alternatively convert a low-voltage side direct current voltage into a second high-frequency alternating current voltage, and output a first high-frequency alternating current voltage to the first power conversion module 10 through the isolation transformer 20 based on the second high-frequency alternating current voltage. In this case, the first power conversion module 10 may further convert, into a high-voltage side direct current voltage, the first high-frequency alternating current voltage input by the isolation transformer 20, and output the high-voltage side direct current voltage to a direct current load (for example, a direct current grid).

In some feasible implementations, when the power converter 2*a* is a bidirectional DC/AC converter, the first power conversion module is a DC/AC conversion module, and the second power conversion module is an AC/AC conversion module. The first power conversion module 10 may convert a high-voltage side direct current voltage (for example, a voltage provided by a direct current grid) into a first high-frequency alternating current voltage, and output a second high-frequency alternating current voltage to the second power conversion module 30 through the isolation transformer 20 based on the first high-frequency alternating current voltage. In this case, the second power conversion module 30 may convert, into a low-voltage side alternating current voltage, the second high-frequency alternating current voltage input by the isolation transformer 20, and output the low-voltage side alternating current voltage to an alternating current load (for example, an alternating current grid). Optionally, the second power conversion module 30 may alternatively convert a low-voltage side alternating current voltage into a second high-frequency alternating current voltage, and output a first high-frequency alternating current voltage to the first power conversion module 10 through the isolation transformer 20 based on the second high-frequency alternating current voltage. In this case, the first power conversion module 10 may further convert, into a high-voltage side direct current voltage, the first high-frequency alternating current voltage input by the isolation transformer 20, and output the high-voltage side direct current voltage to a direct current load (for example, a direct current grid).

In some feasible implementations, a value relationship between a voltage value of the first high-frequency alternating current voltage and a voltage value of the second high-frequency alternating current voltage may be determined based on a transformation ratio of the isolation transformer 20. It may be understood that, when the transformation ratio of the isolation transformer 20 is 1, the voltage value of the first high-frequency alternating current voltage is the same as the voltage value of the second high-frequency alternating current voltage; when the transformation ratio of the isolation transformer 20 is greater than 1, the voltage value of the first high-frequency alternating current voltage is greater than the voltage value of the second high-frequency alternating current voltage; or when the transformation ratio of the isolation transformer 20 is less than 1, the voltage value of the first high-frequency alternating current voltage is less than the voltage value of the second high-frequency alternating current voltage. This may be specifically determined based on an actual application scenario, and is not specifically limited herein.

Figure 6:
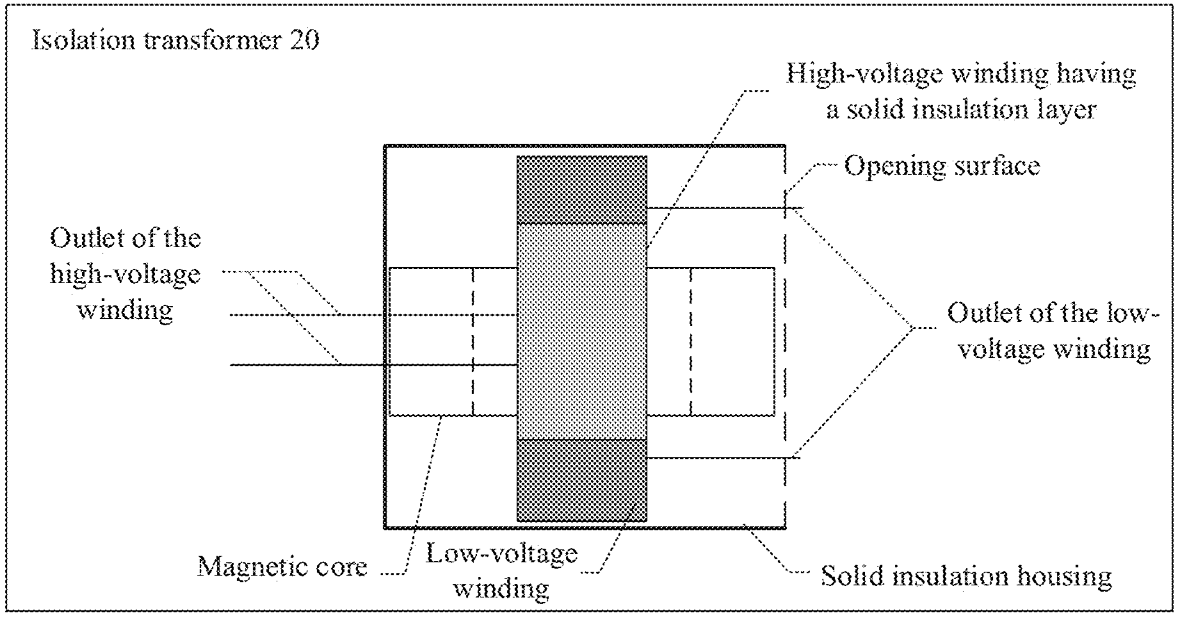
FIG. 6 is a schematic diagram of a structure of an isolation transformer according to this application.

In some feasible implementations, the isolation transformer may include at least one high-voltage winding (namely, one or more high-voltage windings), at least one low-voltage winding (namely, one or more low-voltage windings), and at least one magnetic core (namely, one or more magnetic cores). Herein, there is no connection relationship between the high-voltage winding and the low-voltage winding. The high-voltage winding may be located outside the low-voltage winding and surround the low-voltage winding, and the low-voltage winding is located outside the magnetic core and surrounds the magnetic core. Alternatively, the low-voltage winding may be located outside the high-voltage winding and surround the high-voltage winding, and the high-voltage winding is located outside the magnetic core and surrounds the magnetic core. Optionally, when the isolation transformer includes a plurality of magnetic cores, the high-voltage winding may be located outside one magnetic core and surround the magnetic core, and the low-voltage winding may be located outside another magnetic core and surround the magnetic core. Herein, a position relationship between the high-voltage winding, the low-voltage winding, and the magnetic core may be specifically determined based on an actual application scenario, and is not limited herein. FIG. 6 is a schematic diagram of a structure of an isolation transformer according to this application. As shown in FIG. 6, the isolation transformer 20 in 5*a* in FIG. 5 may include a high-voltage winding, a low-voltage winding, and a magnetic core. When the power converter includes one first power conversion module and one second power conversion module, the high-voltage winding may be connected to the first power conversion module, and the low-voltage winding may be connected to the second power conversion module. The high-voltage winding herein may be understood as a high-voltage winding having a solid insulation layer. The low-voltage winding may be located outside the high-voltage winding and surround the high-voltage winding, and the high-voltage winding is located outside the magnetic core and surrounds the magnetic core.

In some feasible implementations, the high-voltage winding has the solid insulation layer, a conducting layer or a semi-conducting layer is disposed on the solid insulation layer, and the conducting layer or the semi-conducting layer is grounded, to implement solid insulation processing on the high-voltage winding. It may be understood that the solid insulation processing (for example, solid insulation casting or other solid insulation processing) may be performed on the high-voltage winding, so that the high-voltage winding has the solid insulation layer. For ease of description, the following uses the solid insulation casting as an example for description. The solid insulation casting may be performed on the high-voltage winding based on a liquid insulation medium, and the liquid insulation medium is cured by using a heating process, to generate the solid insulation layer on the high-voltage winding. An outer surface of the solid insulation layer is coated with the conducting layer or the semi-conducting layer, and the conducting layer or the semi-conducting layer is grounded, to implement solid insulation processing on the high-voltage winding. Optionally, the conducting layer or the semi-conducting layer is embedded or implanted in an internal position close to the outer surface of the solid insulation layer, and the conducting layer or the semi-conducting layer is grounded, to implement solid insulation processing on the high-voltage winding.

In some feasible implementations, because a voltage of the low-voltage winding is not greatly different from a voltage of the PE, and an insulation layer of a cable of the low-voltage winding may meet an insulation requirement, additional insulation processing does not need to be performed on the low-voltage winding, and the low-voltage winding may be suspended, grounded, or connected to a low potential. It may be understood that, that the low-voltage winding is suspended may be understood as that the low-voltage winding is not grounded; and that the low-voltage winding is connected to the low potential may be understood as that the low-voltage winding is connected to a positive bus or a negative bus of a unipolar direct current port in the second power conversion module, or that the low-voltage winding is connected to a neutral wire or a negative bus of a bipolar direct current port in the second power conversion module, or that the low-voltage winding is connected to a neutral wire of a three-phase alternating current system in the second power conversion module. It can be learned that, according to the isolation transformer provided in this application, solid insulation processing is performed on the high-voltage winding, and no insulation processing is performed on the low-voltage winding. In this way, internal space of the isolation transformer (for example, the isolation transformer 20) can be effectively used, and an insulation material can be saved, so that a volume of the isolation transformer is reduced, and lower costs and higher applicability are ensured.

In some feasible implementations, the isolation transformer 20 further includes a solid insulation housing having an opening surface, the opening surface faces the second power conversion module 30, a surface that is of the solid insulation housing and that faces the first power conversion module is a closed surface, and the solid insulation housing may completely cover the low-voltage winding and the high-voltage winding that has the solid insulation layer. Optionally, a part that is of the magnetic core and that faces the second power conversion module 30 may be exposed. When a distance from a surface of the exposed part of the magnetic core to a left outlet of a high-voltage outlet terminal disposed on the solid insulation housing meets a safety requirement, another surface of the solid insulation housing except the opening surface may completely cover a part that is of the magnetic core and that faces the first power conversion module 10, and partially cover a part that is of the magnetic core and that faces the second power conversion module 30. On the contrary, when a distance from a surface of the exposed part of the magnetic core to a left outlet of a high-voltage outlet terminal does not meet a safety requirement (namely, a safety distance requirement), another surface of the solid insulation housing except the opening surface needs to completely cover the entire magnetic core. For example, as shown in FIG. 6, another surface of the solid insulation housing except the opening surface may completely cover the low-voltage winding, the magnetic core, and the high-voltage winding that has the solid insulation layer, to implement insulation processing on the isolation transformer 20. Optionally, another surface of the solid insulation housing except the opening surface may completely cover the low-voltage winding, a part that is of the magnetic core and that faces the first power conversion module 10, and the high-voltage winding that has the solid insulation layer, and partially cover a part that is of the magnetic core and that faces the second power conversion module 30, to implement insulation processing on the isolation transformer 20. This may be specifically determined based on an actual application scenario, and is not limited herein.

In some feasible implementations, the solid insulation housing may include an oblique closed surface, a curved closed surface, a straight closed surface, and/or a closed surface of another shape. In other words, the solid insulation housing may include one of an oblique closed surface, a curved closed surface, a straight closed surface, and a closed surface of another shape, or a combination of the plurality of closed surfaces. This may be specifically determined based on an actual application scenario, and is not limited herein. Herein, the shape of the solid insulation housing may be determined based on the shapes of the magnetic core, the high-voltage winding, and the low-voltage winding. In this way, internal space of the isolation transformer can be effectively used based on solid insulation housings of different shapes, and overall heat dissipation of the isolation transformer and the power conversion module can be improved during air cooling, so that higher applicability is ensured. For example, as shown in FIG. 6, the solid insulation housing may include a straight closed surface, and the shape of the solid insulation housing is a cuboid.

Figure 7:
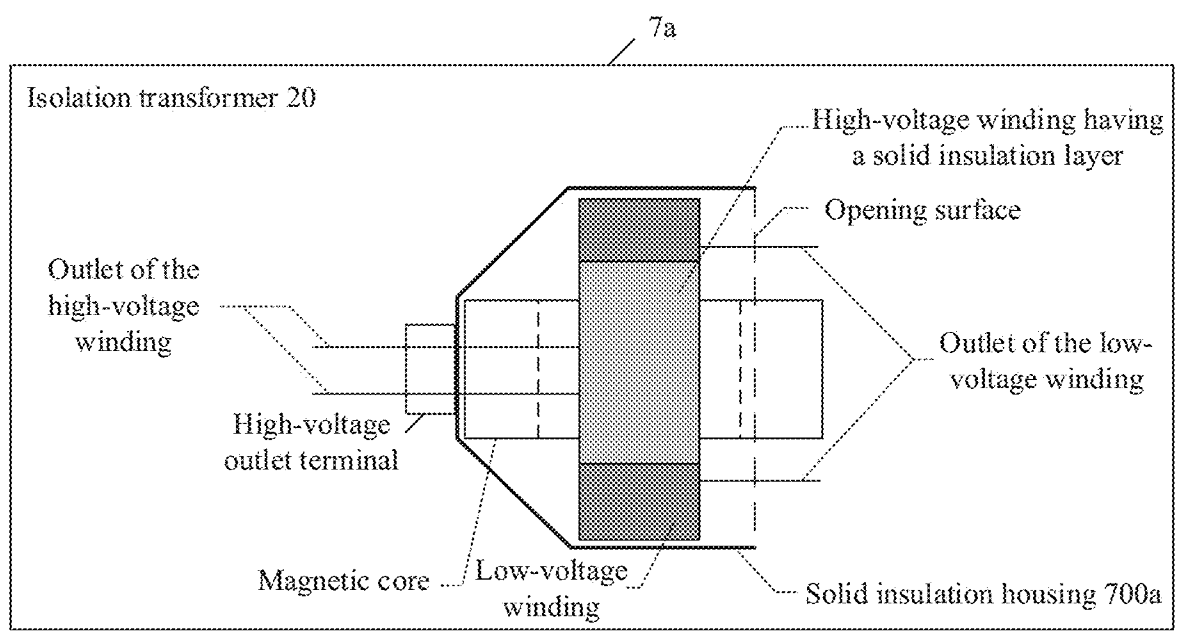
FIG. 7 is a schematic diagram of another structure of an isolation transformer according to this application.
Figure 7:
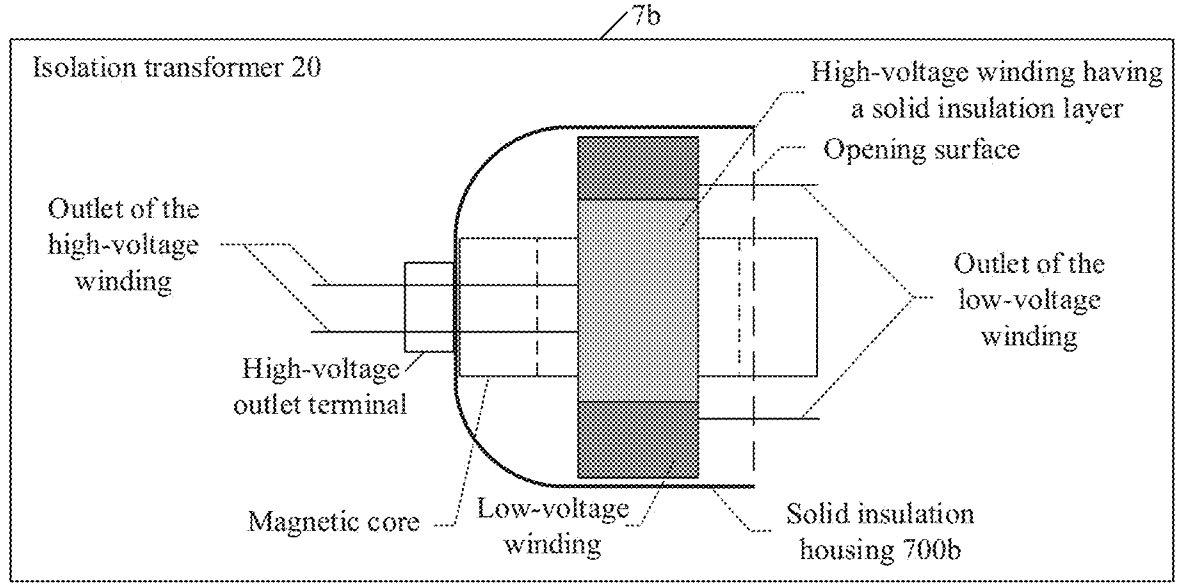

In some feasible implementations, the high-voltage outlet terminal (which may also be referred to as a high-voltage lead terminal) may be disposed on the solid insulation housing. The outlet of the high-voltage winding may be connected to the first power conversion module through the solid insulation housing and the high-voltage outlet terminal, and the outlet of the low-voltage winding may be coupled to the second power conversion module through the opening surface of the solid insulation housing. In other words, the outlet of the low-voltage winding may be directly or indirectly connected to the second power conversion module through the opening surface of the solid insulation housing. FIG. 7 is a schematic diagram of another structure of an isolation transformer according to this application. As shown in 7*a* in FIG. 7, a solid insulation housing (for example, a solid insulation housing 700*a*) of an isolation transformer 20 may include a straight closed surface and an oblique closed surface. In addition, another surface of the solid insulation housing 700*a* except an opening surface may completely cover a low-voltage winding, a part that is of a magnetic core and that faces a first power conversion module, and a high-voltage winding that has a solid insulation layer, and partially cover a part that is of the magnetic core and that faces a second power conversion module. A high-voltage outlet terminal may be further disposed on the solid insulation housing 700*a*. An outlet of the high-voltage winding may be connected to the first power conversion module through the solid insulation housing 700*a* and the high-voltage outlet terminal, and an outlet of the low-voltage winding may be coupled to the second power conversion module through the opening surface of the solid insulation housing 700*a*. As shown in 7*b* in FIG. 7, a solid insulation housing (for example, a solid insulation housing 700*b*) of an isolation transformer 20 may include a straight closed surface and a curved closed surface. In addition, another surface of the solid insulation housing 700*b* except the opening surface may completely cover a low-voltage winding, a part that is of a magnetic core and that faces a first power conversion module, and a high-voltage winding that has a solid insulation layer, and partially cover a part that is of the magnetic core and that faces a second power conversion module. A high-voltage outlet terminal may be disposed on the solid insulation housing 700*b*. An outlet of the high-voltage winding may be connected to the first power conversion module through the solid insulation housing 700*b* and the high-voltage outlet terminal, and an outlet of the low-voltage winding may be coupled to the second power conversion module through the opening surface of the solid insulation housing 700*b*.

In this application, internal space of the isolation transformer can be effectively used, and an insulation material can be saved, so that a volume of the isolation transformer is reduced, and lower costs are ensured. In addition, an air gap required between functional modules in the power converter can be reduced. In this way, internal space of the power converter can be effectively used, so that power density of the power converter is improved, and higher applicability is ensured.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An isolation transformer, wherein the isolation transformer is applicable to a power converter, the power converter further comprises a first power conversion circuit and a second power conversion circuit, the isolation transformer comprises:

a high-voltage winding, connected to the first power conversion circuit, wherein the high-voltage winding has a solid insulation layer, a conducting layer or a semi-conducting layer is disposed on the solid insulation layer, and the conducting layer or the semi-conducting layer is grounded;

a low-voltage winding, connected to the second power conversion circuit, and wherein an insulation withstand voltage requirement of the first power conversion circuit on the ground is higher than an insulation withstand voltage requirement of the second power conversion circuit on the ground; and a solid insulation housing, wherein the solid insulation housing has an opening surface and the opening surface faces the second power conversion circuit, the solid insulation housing covers the low-voltage winding and the high-voltage winding that has the solid insulation layer, a conducting layer or a semi-conducting layer is disposed on the solid insulation housing, and the conducting layer or the semi-conducting layer of the solid insulation housing is grounded.

2. The isolation transformer according to claim 1, wherein the conducting layer or the semi-conducting layer is disposed on an outer surface of the solid insulation layer, or the conducting layer or the semi-conducting layer is disposed at an internal position close to the outer surface of the solid insulation layer.

3. The isolation transformer according to claim 1, wherein the conducting layer or the semi-conducting layer is disposed on an inner surface of the solid insulation housing, or the conducting layer or the semi-conducting layer is disposed at an internal position close to the inner surface of the solid insulation housing.

4. The isolation transformer according to claim 1, wherein the isolation transformer further comprises a magnetic core; and another surface of the solid insulation housing except the opening surface completely covers the magnetic core.

5. The isolation transformer according to claim 1, wherein the isolation transformer further comprises a magnetic core; and another surface of the solid insulation housing except the opening surface completely covers a part that is of the magnetic core and that faces the first power conversion circuit, and partially covers a part that is of the magnetic core and that faces the second power conversion circuit.

6. The isolation transformer according to claim 1, wherein a high-voltage outlet terminal is disposed on the solid insulation housing; and an outlet of the high-voltage winding is connected to the first power conversion circuit through the solid insulation housing and the high-voltage outlet terminal.

7. The isolation transformer according to claim 1, wherein an outlet of the low-voltage winding is coupled to the second power conversion circuit through the opening surface of the solid insulation housing.

8. The isolation transformer according to claim 1, wherein the solid insulation housing comprises at least one of an oblique closed surface, a curved closed surface, or a straight closed surface.

9. A power converter, wherein the power converter comprises:

at least one first power conversion circuit, at least one second power conversion circuit, and at least one isolation transformer, wherein the at least one isolation transformer comprises a high-voltage winding, connected to the at least one first power conversion circuit, wherein the high-voltage winding has a solid insulation layer, a conducting layer or a semi-conducting layer is disposed on the solid insulation layer, and the conducting layer or the semi-conducting layer is grounded;

a low-voltage winding, connected to the at least one second power conversion circuit, and wherein an insulation withstand voltage requirement of the at least one first power conversion circuit on the ground is higher than an insulation withstand voltage requirement of the at least one second power conversion circuit on the ground; and a solid insulation housing, wherein the solid insulation housing has an opening surface and the opening surface faces the at least one second power conversion circuit, the solid insulation housing covers the low-voltage winding and the high-voltage winding that has the solid insulation layer, a conducting layer or a semi-conducting layer is disposed on the solid insulation housing, and the conducting layer or the semi-conducting layer of the solid insulation housing is grounded;

wherein the at least one first power conversion circuit connects to the at least one second power conversion circuit through the at least one isolation transformer.

10. The power converter according to claim 9, wherein the power converter further comprises a conductor layer, the conductor layer covers the opening surface of the solid insulation housing of the at least one isolation transformer, and the conductor layer is connected to a conductive housing of the power converter and is grounded; and the conductor layer is configured to: isolate the at least one isolation transformer and the at least one first power conversion circuit from a first conductive cavity of the power converter, and isolate the at least one second power conversion circuit from a second conductive cavity of the power converter except the first conductive cavity.

11. The power converter according to claim 10, wherein an outlet of a low-voltage winding of the isolation transformer is connected to the second power conversion circuit through the opening surface of the solid insulation housing and the conductor layer.

12. The power converter according to claim 9, wherein the power converter is a bidirectional AC/AC converter; and the at least one first power conversion circuit and the at least one second power conversion circuit each are an AC/AC conversion circuit.

13. The power converter according to claim 9, wherein the power converter is a bidirectional AC/DC converter; and the at least one first power conversion circuit is an AC/AC conversion circuit, and the at least one second power conversion circuit is an AC/DC conversion circuit.

14. The power converter according to claim 9, wherein the power converter is a bidirectional DC/DC converter; and the at least one first power conversion circuit is a DC/AC conversion circuit, and the at least one second power conversion circuit is an AC/DC conversion circuit.

15. The power converter according to claim 9, wherein the power converter is a bidirectional DC/AC converter; and the at least one first power conversion circuit is a DC/AC conversion circuit, and the at least one second power conversion circuit is an AC/AC conversion circuit.

16. The power converter according to claim 9, wherein the power converter comprises a plurality of first power conversion circuits and one isolation transformer, and the isolation transformer comprises a plurality of high-voltage windings; and one end of one first power conversion circuit in the plurality of first power conversion circuits is connected to one high-voltage winding of the isolation transformer, and the other ends of the plurality of first power conversion circuits are connected in series or parallel, or are not connected to each other.

17. The power converter according to claim 9, wherein the power converter comprises a plurality of first power conversion circuits and a plurality of isolation transformers; and one end of one first power conversion circuit in the plurality of first power conversion circuits is connected to a high-voltage winding of one isolation transformer, and the other ends of the plurality of first power conversion circuits are connected in series or parallel, or are not connected to each other.

18. The power converter according to claim 9, wherein the power converter comprises a plurality of second power conversion circuits and one isolation transformer, and the isolation transformer comprises a plurality of low-voltage windings; and one end of one second power conversion circuit in the plurality of second power conversion circuits is connected to one low-voltage winding of the isolation transformer, and the other ends of the plurality of second power conversion circuits are connected in series or parallel, or are not connected to each other.

19. The power converter according to claim 9, wherein the power converter comprises a plurality of second power conversion circuits and a plurality of isolation transformers; and one end of one second power conversion circuit in the plurality of second power conversion circuits is connected to a low-voltage winding of one isolation transformer, and the other ends of the plurality of second power conversion circuits are connected in series or parallel, or are not connected to each other.

20. The power converter according to claim 9, wherein the power converter comprises one first power conversion circuit and a plurality of isolation transformers; and high-voltage windings of the plurality of isolation transformers are connected in series to the first power conversion circuit.

* * * * *